May 28, 1968 T. H. ZBIKOWSKI ET AL 3,385,283
BARBECUE GRILL CONSTRUCTION
Filed June 7, 1967 2 Sheets-Sheet 1
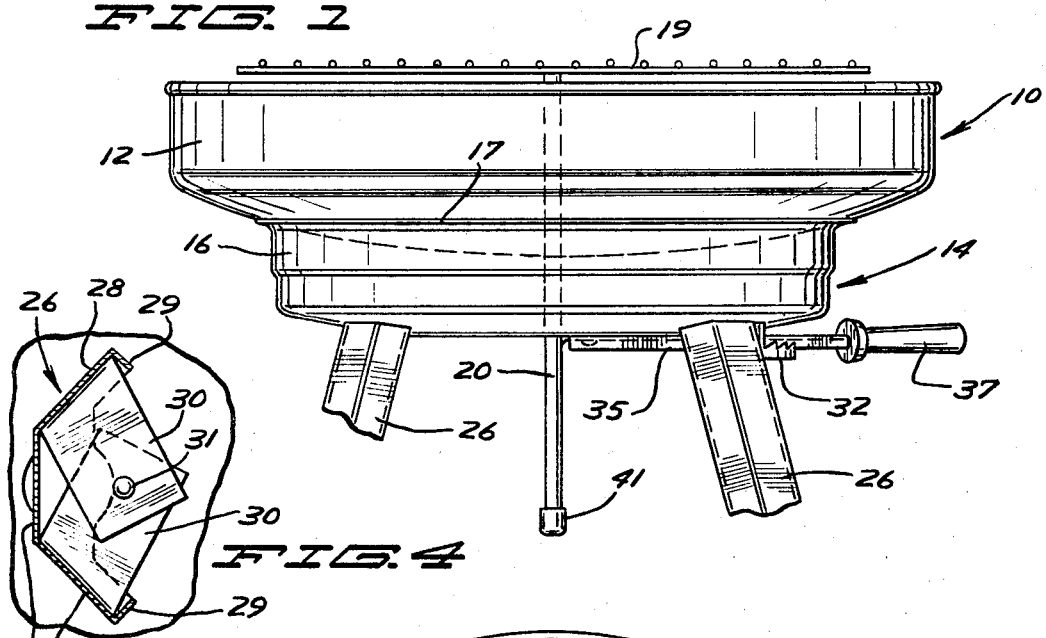
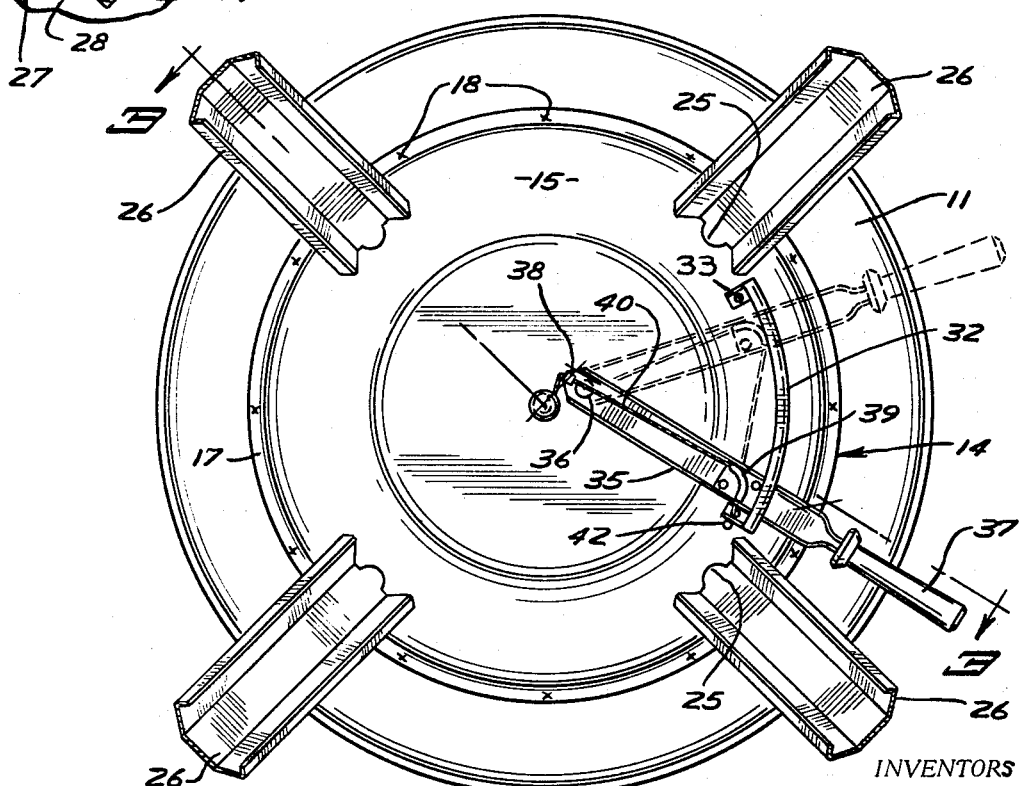
INVENTORS
THEODORE H. ZBIKOWSKI
DOUGLAS S. JENSEN
BY
Carlsen, Carlsen & Sturm
ATTORNEYS

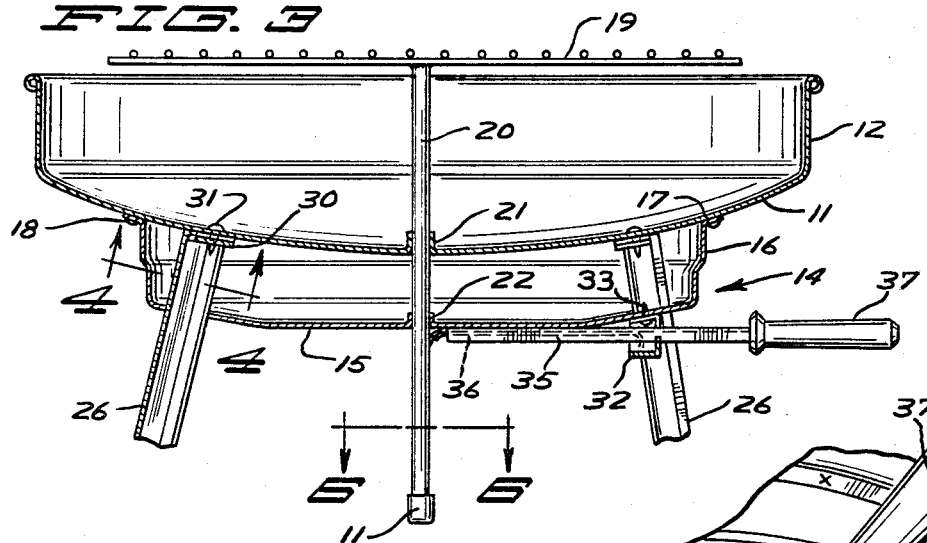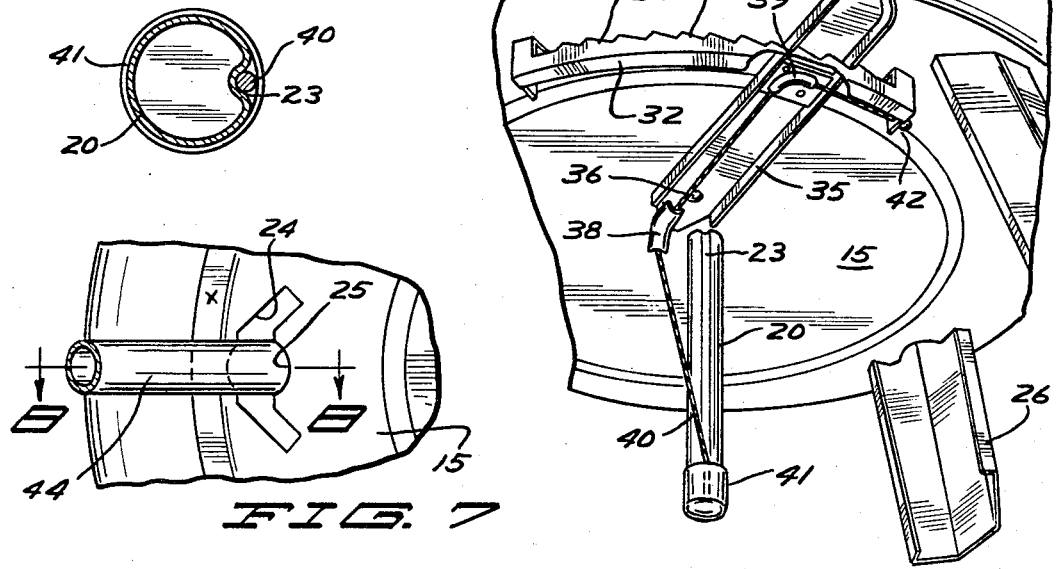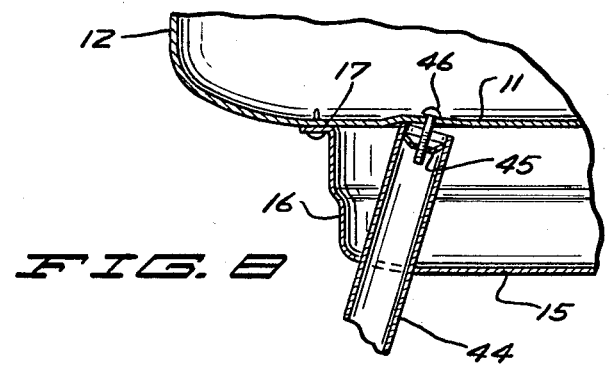

United States Patent Office 3,385,283
Patented May 28, 1968

3,385,283
BARBECUE GRILL CONSTRUCTION
Theodore H. Zbikowski, Plymouth, and Douglas S. Jensen, Mound, Minn., assignors to Tonka Corporation, Mound, Minn., a corporation of Minnesota
Filed June 7, 1967, Ser. No. 644,190
6 Claims. (Cl. 126—25)

ABSTRACT OF THE DISCLOSURE

A brazier type barbecue grill wherein the cooking grid is vertically adjusted relative to the fuel bowl by means of a control movably mounted on the underside of the bowl to create tension or slack in a cable connected to the lower end of an upright post which carries the grid on its upper end. The control is mounted on a support wall disposed under the bowl and said wall also tightly engages the grill legs below their connection with the bowl to rigidify the entire structure.

Background of the invention

This invention relates generally to outdoor barbecue grills and particularly concerns novel means for raising and lowering the cooking grid relative to the fuel bowl and for mounting the support legs on the fuel bowl.

In conventional barbecue grill construction the cooking grid is mounted at the upper end of a post which is slidably received in an aperture centered in the fuel bowl. The bottom end of the post rests upon a stop which can be raised or lowered through the operation of suitable control mechanism mounted on the underside of the bowl. In the main previous grid adjustment mechanisms have not been completely satisfactory for various reasons. Many, such as those incorporating a threaded crank, are very slow operating and frequently become completely inoperative through the accumulation of rust or other foreign matter on the threads. Additionally in prior constructions the grid support post is journaled solely in a bearing in the bottom of the fuel bowl so that any elevating pressures on the post which are not aligned with the axis thereof cause the post to bind in the bearing with the result that the post does not slide freely as desired.

Summary

An object of the present invention is to provide a novel barbecue grill construction wherein a pan-shaped support is mounted on the underside of the grill fuel bowl to rigidify the connection of the grill legs to the bowl and to provide a second bearing for journaling the grid support post so as to prohibit binding of the post during raising and lowering of the grid.

Additionally the present invention utilizes a control lever pivoted on a vertical axis on the underside of the support with a cable extending from the post through a guide means on the lever to an anchor point on the grill so that as the lever is moved about its pivot the cable will be tightened or slackened to raise or lower the post and the grid mounted thereon.

Description of the drawings

FIG. 1 is a side elevation of the upper portion of a barbecue grill embodying the novel construction.

FIG. 2 is an inverted plan view of the grill with the grid elevation control lever shown in two different positions respectively in solid and broken lines.

FIG. 3 is a vertical section through the grill taken on line 3—3 of FIG. 2.

FIG. 4 is a section through a grill support leg taken on line 4—4 of FIG. 3.

FIG. 5 is a perspective view of the underside of the grill.

FIG. 6 is a section taken on line 6—6 of FIG. 3 and looking downwardly.

FIG. 7 is an enlarged fragmentary view showing a different form of support leg used on the grill.

FIG. 8 is a section taken on line 8—8 of FIG. 7.

Description

Referring now more particularly to the drawings, reference characters will be used to denote like parts or structural features in the different views. The barbecue grill, which is of the outdoor brazier type, has a conventional upwardly opening fuel bowl 10 for holding charcoal or the like with a concave bottom wall encircled by an upright side wall 12. A pan 14 which serves as a support member for rigidifying the overall structure, as will be subsequently understood, is mounted against the underside of bottom wall 11. This pan has a bottom wall 15 and a circular stepped side wall 16 provided along its upper edge with a marginal flange 17 which is secured to wall 11 as by rivets 18. Bowl 10 and the rigidifying pan 14 are both circular and are connected concentrically. A circular grid 19 of conventional design is also concentrically positioned with respect to bowl 10 above the bottom 11 thereof and is supported at its center on the upper end of a vertical post 20. This post extends downwardly through an upper bearing 21 in wall 11 and a lower bearing 22 in wall 15 for sliding movement to adjust the elevation of the grid 19.

The bottom wall 15 of the member 14 is provided with various identical shaped openings 24 (FIG. 7) which are equally spaced circumferentially about the bearing 22. There are four of such openings in the embodiment shown. Each opening has a broad C-shape, as shown in FIG. 7, with a round enlargement 25 in the bight portion thereof.

The grill is provided with four identical supporting legs 26, the cross sectional configuration of which can best be observed in FIG. 4. These legs are formed of stamped or bent sheet metal rather than the conventional tubing. Viewing the leg in cross section it has a center portion 27, a pair of side wing portions 28 which are disposed at substantially right angles to each other, and edge flanges 29 on each wing portion 28. At the upper end of each leg 26 a pair of tabs 30 are provided to extend inwardly from the portions 28 in overlapping relation. These tabs are provided with apertures adapted to be brought into alignment for the reception of bolts 31 to secure the legs to the bottom wall 11 of the fuel bowl, as best shown in FIG. 3.

It will be observed by comparing FIGS. 4 and 7 that the leg 26 is designed to fit snugly within the opening 24. Actually the leg is formed to be slightly wider than the opening so that the wing sections 28 must be squeezed slightly inward in a closing direction to insert the leg downwardly into the opening. The leg is accordingly held under some transverse compression in the opening so as to fit tightly within the opening. It will be understood that the pan 14 thus serves to securely hold the legs 26 at a point below their bolted connection at 31 with the fuel bowl and thus rigidify the entire supporting structure.

With continued reference to FIGS. 1 to 5 the mechanism for adjusting the elevation of grid 19 will be described. A bracket 32, shown best in FIG. 5, is mounted on the bottom wall 15 of the pan 14. This bracket has an arcuate configuration curving about the axis of post 20. The end portions of the bracket are provided with tabs which are secured to the pan by rivets 33.

Intermediate the end connections of bracket 22 with the pan 14 it is spaced from the pan bottom 15 and has a row of upwardly projecting teeth 34 spaced therealong.

An elongated lever 35 of inverted channel construction has its inner end pivoted as by rivet 36 to the pan bottom 15 adjacent to but axially offset from the bearing 22. Lever 35 extends outwardly in a generally radial direction with respect to post 20 and between the bottom 15 and bracket 32 with channel edges engageable with the teeth 34. As shown in FIG. 5 the channel is of sufficient width to encompass two of the teeth with the channel edges fitting between adjacent teeth to releasably lock the lever against movement about its pivot 36. The outer end of the lever 35 is reduced to allow a handle 37 to fit thereover.

A curved trough-shaped guide 38 is integrally formed on the underside of the lever 35 near the pivot 36. This is referred to as the front or inner guide and has its inner end portion directed downwardly. A second guide which is referred to as the rear or outer guide, denoted at 39, is mounted on the underside of lever 35 just forward or inward of the point of lever engagement with the bracket teeth 34. Guide 39 is an L-shaped trough with its rear portion directed toward one end of the bracket 32. A cable 40 of suitably heavy wire has one end connected to the bottom end of post 20 as by cap 41 securing the cable in a groove 23 and from said connection the cable extends upwardly and through the inner guide 38, then outwardly and through the outer guide 39 and laterally from the lever to an end portion of bracket 32 where it is anchored as at 42.

Height adjustment of grid 19 through operation of the lever 35 will now be understood. When the control handle 37 is at the extreme right as viewed in FIG. 5, the post 20 and grid 19 will be at their lowest positions. As the handle 37 and lever 35 are moved to the left the distance between the outer guide 39 and connection 42 will be increased causing a tension on the cable 40 with a resultant upward pull on the connection at 41 to slide the post upwardly in bearings 21 and 22. There is sufficient resiliency in lever 35 to allow the channel walls thereof to be raised to clear the tops of teeth 34 and when the desired grid elevation has been reached the channel walls will engage and lock behind the teeth 34 immediately thereunder.

When it is desired to lower the grid 19 the handle 37 is raised and lever 35 moved toward the right decreasing the distance from guide 39 to the connection 42. The slack in the cable thus created allows the post 20 to gravitationally slide downwardly in bearings 21 and 22 until the desired grid elevation is reached.

Turning now to FIGS. 7 and 8 it will be observed that tubular legs such as denoted at 44 can also be used to support the grill without changing the shape of the opening 24. Leg 44 fits snugly in the enlarged portion 25 of the opening. A spring type expandable nut 45 is inserted into the upper end of the leg and receives the screw 46 which pulls the leg firmly against the bowl bottom 11, as shown in FIG. 8.

It will accordingly be understood that the pan-shaped member 14 serves the threefold purpose of rigidifying the leg structure, providing a second bearing for the post 20 to prevent binding thereof during its sliding movement and supporting the mechanism for raising and lowering the grid 19 relative to the fuel bowl 10. Also the bracket 32, lever 35 and cable 40 arrangement provides a novel mechanism for quickly and positively adjusting the grid.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a barbecue grill
   (a) an upwardly opening fuel bowl structure having a bottom wall with a central aperture therein,
   (b) a grid disposed over the bottom wall and connected at its center to the upper end of an upright post,
   (c) said post extending downwardly and slidably through said aperture with the bottom end thereof spaced a substantial distance below said wall,
   (d) an elongated lever having one end pivoted to the underside of the bowl structure on an upright axis and extending outwardly in a direction generally radially with respect to the post,
   (e) a guide means in fixed position on the lever,
   (f) and a cable having one end fixed to the bottom end of the post and extending through the guide means on the lever and having its other end fixed to the said bowl structure,
   (g) whereby as the lever is moved about its pivot the distance between the guide means and fixed end of the cable will be increased or decreased to respectively raise or lower said post and the grid mounted thereon.

2. The subject matter of claim 1 wherein locking means are provided on the bowl structure for releasably locking the lever in any selected one of several different positions.

3. The subject matter of claim 1 wherein a second guide means is provided on the lever adjacent to its pivot and said cable being trained through said second guide means in its extension from the first guide means to the post so that the cable will exert an upward pull on the post when the lever is operated to raise the grid.

4. The subject matter of claim 2 wherein said locking means comprises a bracket having a series of latch teeth, and catch means on the lever for engaging and locking with said teeth.

5. The subject matter of claim 1 wherein a support member is mounted on said bottom wall to depend therebelow, said support member having an aperture vertically aligned with the aperture in said bottom wall and also slidably receiving said post, and said lever being pivoted on the support member.

6. In a barbecue grill
   (a) an upwardly opening fuel bowl having a bottom wall,
   (b) a support member mounted on said bottom wall and presenting a support wall in spaced relation below and generally parallel to said bottom wall,
   (c) a cooking grid disposed over the bottom wall and connected at its center to an upright post,
   (d) said post extending through and being slidably mounted in said walls for raising and lowering of the grid,
   (e) an adjustable control means mounted on the support member and connected to the post for selectively raising or lowering the post,
   (f) the support wall having a plurality of leg openings circumferentially spaced about the axis of the post,
   (g) and a plurality of support legs for the fuel bowl each having its upper end rigidly secured to the bottom wall and extending downwardly in tight fitting relation through one of said openings for engagement with the ground.

References Cited
UNITED STATES PATENTS

| | | | |
|---|---|---|---|
| 2,472,164 | 6/1949 | Mannheimer. | |
| 2,852,016 | 9/1958 | Weatherwax | 126—9 |
| 2,922,414 | 1/1960 | Brender | 126—9 |
| 2,986,137 | 5/1961 | Brown. | |

FREDERICK L. MATTESON, JR., *Primary Examiner.*

E. G. FAVORS, *Assistant Examiner.*